United States Patent
Texler et al.

(10) Patent No.: US 12,169,880 B2
(45) Date of Patent: Dec. 17, 2024

(54) HIERARCHICAL MODEL-BASED GENERATION OF IMAGES

(71) Applicant: SAMSUNG ELECTRONICS CO., LTD., Gyeonggi-Do (KR)

(72) Inventors: Ondrej Texler, San Jose, CA (US); Dimitar Petkov Dinev, Sunnyvale, CA (US); Ankur Gupta, San Jose, CA (US); Hyun Jae Kang, Mountain View, CA (US); Anthony Sylvain Jean-Yves Liot, San Jose, CA (US); Siddarth Ravichandran, Santa Clara, CA (US); Sajid Sadi, San Jose, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 110 days.

(21) Appl. No.: 17/967,868

(22) Filed: Oct. 17, 2022

(65) Prior Publication Data
US 2023/0394715 A1    Dec. 7, 2023

Related U.S. Application Data

(60) Provisional application No. 63/349,289, filed on Jun. 6, 2022.

(51) Int. Cl.
G06T 11/00    (2006.01)
G06T 7/70     (2017.01)
G06T 13/00    (2011.01)

(52) U.S. Cl.
CPC ............... G06T 11/00 (2013.01); G06T 7/70 (2017.01); G06T 13/00 (2013.01); *G06T 2207/20084* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 7,123,262 B2 | 10/2006 | Francini et al. |
| 11,158,102 B2 | 10/2021 | Liu et al. |
| 11,211,060 B2 | 12/2021 | Li et al. |
| 11,308,671 B2 | 4/2022 | Chen et al. |

(Continued)

FOREIGN PATENT DOCUMENTS

| | | |
|---|---|---|
| CN | 110288682 A | 9/2019 |
| CN | 113554737 A | 10/2021 |

(Continued)

OTHER PUBLICATIONS

Fan et al. (A deep bidirectional LSTM approach for video-realistic talking head, Springer Science + Business Media New York, 2015) (Year: 2015).*

(Continued)

*Primary Examiner* — Kyle Zhai
(74) *Attorney, Agent, or Firm* — CUENOT, FORSYTHE & KIM, LLC

(57) ABSTRACT

Image generation using a hierarchical, model-based system includes generating a first region of an image using a first neural network model. The first region of the image is provided to a second neural network model as input. A second region of the image is generated using the second neural network model. The second region of the image shares a boundary with at least a portion of the first region of the image.

16 Claims, 8 Drawing Sheets

(56) References Cited

U.S. PATENT DOCUMENTS

| | | | |
|---|---|---|---|
| 2005/0151743 A1 | 7/2005 | Sitrick | |
| 2005/0286799 A1 | 12/2005 | Huang | |
| 2014/0198121 A1* | 7/2014 | Tong | G06T 11/60 |
| | | | 345/581 |
| 2018/0174348 A1 | 6/2018 | Bhat | |
| 2019/0138096 A1 | 5/2019 | Lee et al. | |
| 2020/0234482 A1 | 7/2020 | Krokhalev | |
| 2021/0150793 A1 | 5/2021 | Stratton et al. | |
| 2021/0233299 A1 | 7/2021 | Zhou et al. | |
| 2021/0256962 A1 | 8/2021 | Liu et al. | |
| 2021/0327404 A1 | 10/2021 | Savchenkov et al. | |
| 2021/0350528 A1* | 11/2021 | Tang | G06V 10/751 |
| 2022/0084502 A1 | 3/2022 | Ma et al. | |
| 2022/0108510 A1 | 4/2022 | Sagar et al. | |
| 2022/0207262 A1 | 6/2022 | Jeong et al. | |
| 2023/0042654 A1 | 2/2023 | Zhang | |
| 2023/0394732 A1 | 12/2023 | Texler et al. | |

FOREIGN PATENT DOCUMENTS

| | | |
|---|---|---|
| CN | 113609255 A | 11/2021 |
| KR | 102251781 B1 | 5/2021 |
| KR | 1020210070169 A | 6/2021 |
| WO | 2021023869 A1 | 2/2021 |
| WO | 2021112365 A1 | 6/2021 |

OTHER PUBLICATIONS

Yao et al. (Iterative Text-Based Editing of Talking-Heads Using Neural Retargeting, ACM Transactions on Graphics, 2021) (Year: 2021).*

Guo et al. (AD-NeRF: Audio Driven Neural Radiance Fields for Talking Head Synthesis, IEEE, 2021) (Year: 2021).*

WIPO Appln. No. PCT/KR2023/005004, International Search Report, Aug. 1, 2023, 3 pg.

WIPO Appln. No. PCT/KR2023/005004, Written Opinion, Aug. 1, 2023, 4 pg.

Aneja, D. et al., "A High-Fidelity Open Embodied Avatar with Lip Syncing and Expression Capabilities," In 2019 International Conference on Multimodal Interaction Oct. 14, 2019 (pp. 69-73).

Prajwal, K.R. et al., "A lip sync expert is all you need for speech to lip generation in the wild," arXiv Preprint, arXiv: 2008.10010v1, Aug. 23, 2020, 10 pg.

Ronneberger, O. et al., "U-Net: Convolutional Networks for Biomedical Image Segmentation," arXiv Preprint, arXiv: 1505.04597v1, May 18, 2015, 8 pg.

Siarohin, A. et al., "First Order Motion Model for Image Animation," Advances in Neural Information Processing Systems, 2019, vol. 32, 11 pg.

"Synthesia, #1 AI Video Generation Platform," [online] © 2023 Synthesia Limited [retrieved Nov. 2, 2023], retrieved from the Internet: <https://www.synthesia.io/>, 14 pg.

Suwajanakorn, S. et al. "Synthesizing Obama: Learning Lip Sync from Audio," ACM Transactions on Graphics (ToG), Jul. 20, 2017, vol. 36, No. 4, pp. 1-3 [Abstract].

Theis, J. et al., "Face2Face: Real-time Face Capture and Reenactment of RGB Videos," arXiv Preprint, arXiv: 2007.14808v1, Jul. 29, 2020, 12 pg.

"Pinscreen: AI-Driven Virtual Avatars," [online] © 2020 Pinscreen Inc. [retrieved Nov. 2, 2023], retrieved from the Internet: <https://www.pinscreen.com/>, 8 pg.

Zhou Y. et al., "VisemeNet: Audio-Driven Animator-Centric Speech Animation," ACM Transactions on Graphics (ToG), vol. 37, No. 4, Aug. 2018., pp. 1-10.

* cited by examiner

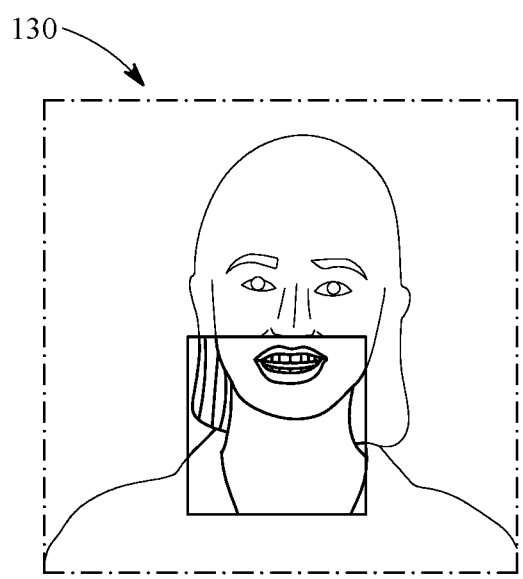 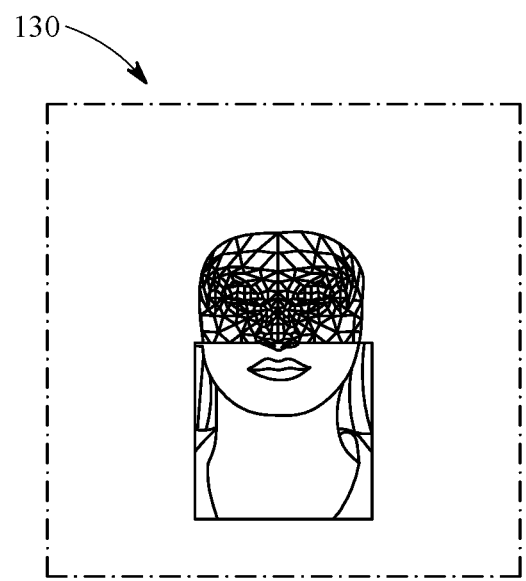
FIG. 3A  FIG. 3B

700

Generate a first region of an image using a first neural network model
702

Provide the first region of the image to a second neural network model as input
704

Generate a second region of the image using the second neural network model, wherein the second region of the image shares a common boundary with at least a portion of the first region of the image.
706

FIG. 7

HIERARCHICAL MODEL-BASED GENERATION OF IMAGES

CROSS-REFERENCE TO RELATED APPLICATIONS

This application claims the benefit of U.S. Application No. 63/349,289 filed on Jun. 6, 2022, which is fully incorporated herein by reference.

TECHNICAL FIELD

This disclosure relates to image processing and generation and, more particularly, to generating images using a network architecture of hierarchically organized neural network models.

BACKGROUND

Digital humans are becoming increasingly popular owing to various reasons such as the increasing popularity of the Metaverse, the adoption of virtual experiences across different segments of society, and recent advances in hardware and other technologies such as neural networks that facilitate rapid virtualization. A digital human is a computer-generated entity that is rendered visually with a human-like appearance. Digital humans may also be referred to as "virtual humans." A digital human typically includes elements of artificial intelligence (AI) that allow the digital human to interpret user input and respond to the user input in a contextually appropriate manner. For example, one objective of digital human technology is to endow the digital human with the ability to interact with human beings using contextually appropriate verbal and non-verbal cues. By incorporating Natural Language Processing (NLP) capabilities with the digital human, the digital human may provide human-like interactions with users and/or perform various tasks such as, for example, scheduling activities, initiating certain operations, terminating certain operations, and/or monitoring certain operations of various systems and devices. Digital humans may also be used as avatars.

When creating a digital human that is supposed to perfectly resemble a real human, the quality of textures and the resolution of the resulting images play an important role. This means that all body parts of the digital human must have correct textures. That is, hair should look like it is composed of individual strands of hair, a shirt should look like it is made out of fabric, skin should have pores, etc. For these details to be visible, the digital human must be generated at a relatively high resolution.

The fact that a variety of different use cases entail the use of avatars shown on large screens only adds to the need for high resolution images. For example, a digital human may be displayed on a screen of a kiosk or other system that is large enough so that the digital human, as rendered, appears life-size (e.g., of average height and size corresponding to a real human). These displays may be positioned in various locations including, but not limited to, airport halls, hotels, public spaces, and the like. For all of these use cases and others, it is important for the digital human or avatar to be rendered at a high-resolution while maintaining particular qualities such as good lip motion, sharp textures, and the like.

Unfortunately, modern hardware and neural network technologies struggle with generating high-resolution images and/or video of sufficient quality. Simply increasing the resolution and the complexity of what a neural network is asked to generate does not yield the desired image quality. In many cases, such an approach actually leads to a loss of semantic quality or a loss of other qualitative aspects in the resulting image(s). Increasing the network capacity alone, meaning adding more learnable parameters, does not always overcome this problem either.

As an illustrative example, in cases where a neural network was trained using head images of 1024×1024 pixels in resolution and then tasked with generating a high-quality image of a head, the neural network paid less attention to smaller features or parts of the image that was generated. In generating the 1024×1024 image, the neural network generated multiple different regions of the image including hair, shirt, eyes, eyebrows, mouth, teeth, and the like. The neural network generated an image, however, in which small regions of the image such as the mouth region and/or teeth were not reproduced faithfully. The failure to generate high-quality features such as a mouth and/or teeth in the resulting image is a significant issue in the context of generating digital humans or other high-quality images.

In many cases, the quality of particular features (e.g., mouth and teeth) of images generated by a neural network trained on high-resolution images of human heads was lower than the features generated by a neural network trained using lower-resolution images of 256×256 pixels. Thus, simply increasing resolution of the neural network often results in reduced quality images. Current methods for generating images, e.g., digital humans, may support resolutions of 256×256 pixels or even 512×512 pixels, but are unable to scale up to generate high-quality images with resolutions of approximately 1024×1024 pixels or higher.

SUMMARY

In one or more example implementations, a method includes generating a first region of an image using a first neural network model. The method includes providing the first region of the image to a second neural network model as input. The method also includes generating a second region of the image using the second neural network model. The second region of the image shares a boundary with at least a portion of the first region of the image.

In one or more example implementations, a system includes one or more processors configured to initiate operations. The operations include generating a first region of an image using a first neural network model. The operations include providing the first region of the image to a second neural network model as input. The operations also include generating a second region of the image using the second neural network model. The second region of the image shares a boundary with at least a portion of the first region of the image.

In one or more example implementations, a computer program product includes one or more computer readable storage media having program code stored thereon. The program code is executable by a processor to perform operations. The operations include generating a first region of an image using a first neural network model. The operations include providing the first region of the image to a second neural network model as input. The operations also include generating a second region of the image using the second neural network model. The second region of the image shares a boundary with at least a portion of the first region of the image.

This Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

The accompanying drawings show one or more embodiments; however, the accompanying drawings should not be taken to limit the invention to only the embodiments shown. Various aspects and advantages will become apparent upon review of the following detailed description and upon reference to the drawings.

FIG. 3A illustrates an example of guide data specified as a contour drawing.

FIG. 3B illustrates an example of guide data specified as a mesh wireframe.

FIG. 7 illustrates an example method that may be performed by a system executing a network architecture.

DETAILED DESCRIPTION

Figure 1:
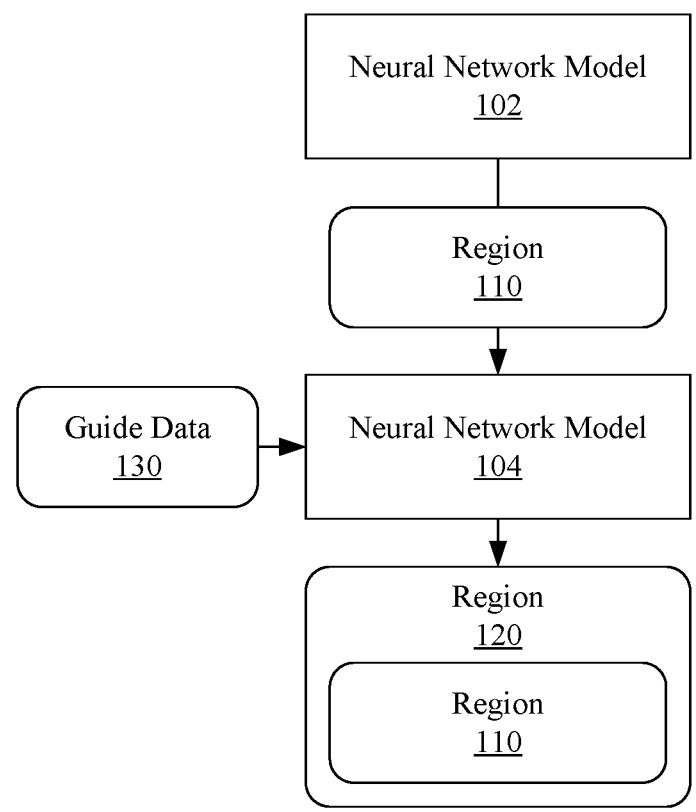
FIG. 1 illustrates an example of a network architecture that is executable by a data processing system to perform hierarchical image generation.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to image processing and generation and, more particularly, to generating images using a network architecture of hierarchically organized neural network models. The resulting images are of high-quality and high-resolution. The inventive arrangements may be used to generate any of a variety of different types of such images. These images typically include a region of high detail and/or importance that is joined with one or more other regions that have a lesser amount of detail and/or importance.

In accordance with the inventive arrangements described within this disclosure, methods, systems, and computer program products are disclosed that are capable of rendering images of high-quality and high-resolution in a hierarchical manner. The system may execute a network architecture that includes a plurality of neural network models. The neural network models are coupled together serially as a pipeline, e.g., as a hierarchical neural network architecture. Different neural network models of the network architecture may be responsible for generating different regions of the final image that is to be generated. Each successive neural network model in the network architecture is conditioned by the result of the prior neural network model. The resulting image includes each region as generated by a different neural network model of the network architecture. The different regions, as generated by the different levels of the network architecture, may be included in the image in an unmodified form. That is, the final image incorporates each region as generated by a particular neural network model thereby preserving the details therein to produce a high-quality and high-resolution image.

For example, a first neural network model of the network architecture generates a first region of the image and one or more other neural network models of the network architecture generate one or more other regions of the image. The resulting image is of high-quality in that the image includes well-defined features and/or textures. Typically, the first region of the image is one in which greater attention to detail is needed. For example, the first region may be of an object such as a car, a human, or a portion of an object. The other regions of the image may be background or other portions of the object that require a lesser amount of detail. In one particular example, the network architecture described herein is capable of using a first neural network model to generate a first region such as a mouth region. Further neural network models may generate other regions of the image such as the surrounding portions of the head and/or the body to complete an image of a digital human or avatar.

Further aspects of the inventive arrangements are described below in greater detail with reference to the figures. For purposes of simplicity and clarity of illustration, elements shown in the figures are not necessarily drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example implementation of a network architecture 100. Network architecture 100 is configured to perform hierarchical image generation. Network architecture 100 may be implemented as a software framework that is executable by a data processing system. An example of a data processing system that is suitable for executing network architecture 100 as described herein and/or for training the various neural network models included in network architecture 100 is described herein in connection with FIG. 8.

In the example, network architecture 100 includes a neural network model 102 and a neural network model 104. Neural network model 102 and neural network model 104 are arranged in series as a pipeline such that neural network model 104 is conditioned on the output of neural network model 102. That is, the output generated by neural network model 102 is fed, or provided, to neural network model 104 as input. Neural network model 104 is trained to reproduce the output generated by neural network model 102 and further generate other features in accordance with any received inputs. In this regard, the output of neural network model 104 is conditioned on the input(s) received.

For purposes of illustration, only two stages (e.g., neural network models) are illustrated. It should be appreciated, however, that network architecture 100 may include one or more additional neural network models as additional levels of the hierarchy depending on the application and/or particular type of image(s) that are to be generated.

In one or more example implementations, each of neural network model 102 and neural network model 104 may be implemented as an image-to-image translation network. Image-to-image translation networks are generative neural network models. Examples of generative neural network models can include, but are not limited to, Generative Adversarial Networks (GANs) and Variational Autoencoders (VAEs).

In general, a GAN includes two neural networks referred to as a generator and a discriminator. The generator and the discriminator are engaged in a zero-sum game with one another. Given a training set, a GAN is capable of learning to generate new data with the same statistics as the training set. As an illustrative example, a GAN that is trained on an image or image library is capable of generating different images that appear authentic to a human observer. In a GAN, the generator generates images. The discriminator determines a measure of realism of the images generated by the generator. As both neural networks may be dynamically updated during operation (e.g., continually trained during operation), the GAN is capable of learning in an unsupervised manner where the generator seeks to generate images with increasing measures of realism as determined by the discriminator.

An autoencoder refers to an unsupervised artificial neural network that learns how to efficiently compress and encode data. The autoencoder learns how to reconstruct the data back from the reduced encoded representation to a representation that is as close to the original input as possible. A VAE is an autoencoder whose encodings distribution is regularized during the training in order to ensure that the latent space has properties sufficient to allow the generation of some portion of new data.

In one or more example implementations, neural network model 102 and neural network model 104 each may be implemented as a U-Net neural network. An example of a neural network implemented as a U-Net neural network is described in Ronneberger et al., "U-Net" Convolutional Networks for Biomedical Image Segmentation," (May 18, 2015), which is incorporated herein by reference in its entirety.

In one aspect, each of neural network model 102 and neural network model 104 may be implemented as a similar or a same neural network (e.g., different instances of a same neural network), albeit trained to generate different regions of an image. Referring to FIG. 1, neural network model 102 is trained to generate region 110. For purposes of illustration, region 110 is considered to include more detail and include features that may be difficult to learn to generate or render. Region 110 may be considered of greater importance than region 120 in terms of perceiving the resulting image generated by network architecture 100 to be of high-quality. Neural network model 104 is trained to generate region 120. In this regard, each of neural network model 102 and neural network model 104 is trained to generate a different region or portion of the image to be generated. In the case of generating an image of a digital human, for example, region 110 may be the mouth region of the digital human. Region 120 may be the head or face region of the digital human.

Figure 2:
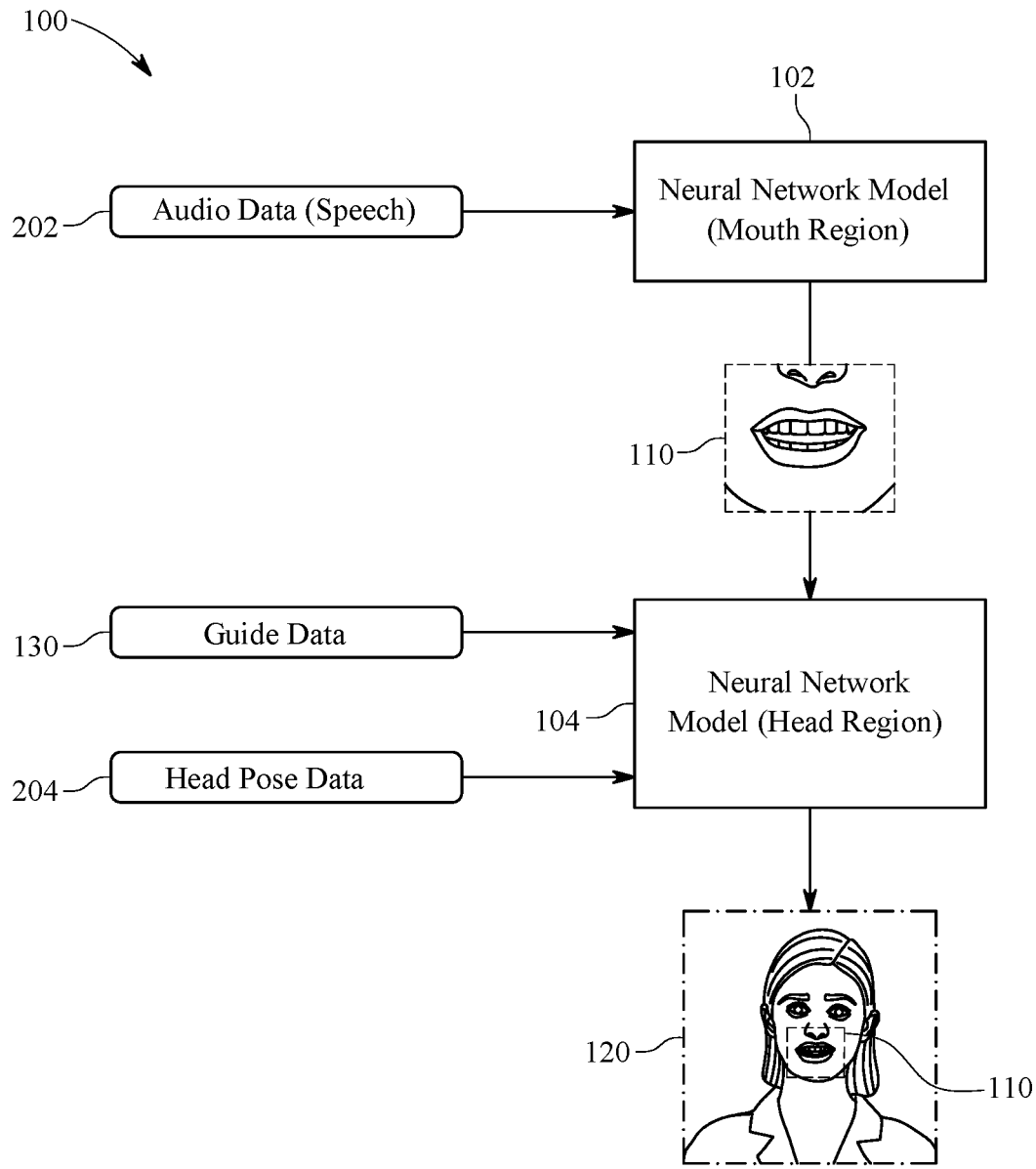
FIG. 2 illustrates another example of a network architecture that is executable by a data processing system to perform hierarchical image generation.

In one or more example implementations, as illustrated in the example of FIG. 1, neural network model 102 need not receive any input data. That is, neural network model 102 may be configured to generate region 110 without receiving input data. In one or more other example implementations, neural network model 102 may generate region 110 based on received input data. An example of input data provided to neural network model 102 is illustrated in FIG. 2.

In the example of FIG. 1, region 110 shares a common border with at least a portion of region 120. In some cases, region 110 may be completely encompassed by region 120. In the example of FIG. 1, with no further neural network models being shown, region 120 represents the final image. In the example of FIG. 1, each of neural network model 102 and neural network model 104 is capable of generating output (e.g., regions) in the form of a Red-Green-Blue (RGB) image.

In generating region 120, neural network model 104 also receives guide data 130 as input. Guide data 130 may be used by neural network model 104 to position region 110 within region 120. For example, guide data 130 may be specified as a contour drawing, a segmentation map, a mesh rendering (e.g., a mesh wireframe or mesh drawing), or other representation of the image to be generated. In general, neural network model 104 is capable of using region 110 in an unmodified form and generating portions of region 120 outward from region 110.

Network architecture 100 may be used to generate any of a variety of different images. In one aspect, the image to be generated may be that of a digital human, an avatar, a portion of a digital human, or a portion of an avatar. An avatar is an icon or figure representing a particular person in video games, internet forums, in virtual environments which may include the Metaverse. In another aspect, the image to be generated may be a landscape (e.g., background) or other scene that includes a foreground object such as a digital human, an avatar, automobile or other object intended to be rendered in high-quality. Appreciably, depending on the number of levels of the hierarchy (e.g., the number of neural network models pipelined together), the resulting image may not be fully generated until the final level of network architecture 100 has operated and output the region for that level. That is, the region generated by the final neural network model of the network architecture 100 may be considered the final image or final output.

FIG. 2 illustrates another example implementation of network architecture 100. In the example of FIG. 2, neural network model 102 is specifically configured, or trained, to generate images of mouths. Neural network model 104 is specifically configured, or trained, to generate images of heads. As illustrated, region 110 is that of a mouth, while region 120 is that of a head that incorporates, includes, or uses region 110 as the mouth of the head. In the example, region 120 includes, or encompasses, region 110. If no further regions are to be generated, region 120 represents the final image generated by network architecture 100.

In general, a neural network model may be trained to a point where the parameters of the neural network model have converged or substantially converged. The goal of the training process is to change the input-output relationship of the neural network model. The training process determines a set of parameters, e.g., weights and/or biases, that provide the neural network model with the desired input-output relationship. As an illustrative example, a learning process can adjust the weights of a neural network model repeatedly to change the input-output relationship so that an input-output accuracy cost function is optimized. During the training process, computational efficiency and/or power efficiency may not be a consideration. The term "computational efficiency," as used within this disclosure, means the ability to perform operations as part of executing a neural network model without wasting time or energy, where the operations include, but are not limited to, calculations (e.g., multiply, add, and so forth) and memory accesses. While power efficiency may be considered independently of computational efficiency, increased power efficiency may arise from increased computational efficiency of a system.

In the example of FIG. 2, guide data 130 may specify various parameters that are used by neural network model 104 to generate region 120. With neural network model 104 being configured to generate the head region of the image, guide data 130 may specify parameters such as head shape, whether the eyes are to be open or closed, and location of region 110 with respect to, or within, region 120. These features may be specified by contours or other mechanisms depending on the particular form of guide data 130. Using guide data 130 and region 110 as inputs, neural network model 104 is capable of generating region 120. In the example, region 110 is effectively pasted into region 120 at a position or location specified by guide data 130 in unmodified form. The features of region 120 such as the nose, eyes, and the like may be generated conditioned upon guide data 130 and region 110.

As a result, neural network model 104 generates region 120 to agree with region 110. That is, neural network model 104 is capable of generating textures that are the same and that have the same level of sharpness or blurriness as those generated by neural network model 102. In region 120, the boundary between region 120 and region 110 is not noticeable such that one is unable to determine, from a visual inspection, that the resulting image was generated on a region-by-region basis as described herein.

FIG. 2 illustrates another aspect of network architecture 100 in which each of neural network model 102 and neural network model 104 utilizes a different data modality. That is, neural network model 102 is conditioned on a first data modality (e.g., received as an input), while neural network model 104 is conditioned on a second and different data modality (e.g., received as an additional input). In the example, the two data modalities include audio data 202 and head pose data 204. Audio data 202 in this example is speech data. Thus, rather than using one large neural network model that accepts both modalities and is capable of generating an entire image, the hierarchical approach described herein utilizes separate neural network models each using a different modality. In this example, neural network model 102 uses audio data 202 (e.g., speech data) to predict or generate lip formation within region 110. Neural network model 102 is unaware of head pose information. Neural network model 104 uses head pose data 204 to generate region 120 surrounding region 110. Neural network model 104 is unaware of audio data 202.

In using multiple data modalities with a single, larger neural network, issues such as overfitting often arise during multi-modal training. The hierarchical approach described herein, where modalities are split among different levels (e.g., neural network models) of network architecture 100, can alleviate the overfitting issue since each neural network model considers only a subset of the data modalities to be used by network architecture 100. This segmentation of data modalities among different neural network models of the larger system provides each neural network model only with the particular data modality that is needed and avoids providing unnecessary data to the respective neural network models, which may reduce the quality of the resulting regions generated by the respective neural network models. In general, restricting the number of features that each of the neural network models must focus on or contend with has the effect of increasing the quality of the resulting region that is generated. That is, the features of the regions generated by the different neural network models are of higher quality than the image generated by a single, larger network model.

For example, in the case of FIG. 2, the mouth region is a hard-to-learn region mainly due to the large variety of lip motions that are possible and the fact that the teeth are not always visible. For these reasons, using a neural network model dedicated to, or that focuses on, generating the mouth region alone can be beneficial to generate the level of detail needed. Generating an accurate and high-quality mouth region is important since the perception of this region by actual humans is very sensitive to any perceivable visual artifacts (e.g., visual irregularities). To maintain a high-level of quality, neural network model 104 is capable of integrating region 110 within region 120 so that there is no visible seem or boundary between the two regions (e.g., no visible seem or boundary around region 110). This means that as images generated by network architecture 100 are sequenced into video to simulate lip motion, the movement of the mouth region will agree with the movement of the surrounding face. Preferably, the movement of the mouth region perfectly agrees with the movement of the surrounding face.

FIGS. 3A and 3B illustrate different examples of guide data 130. FIG. 3A illustrates an example of guide data 130 specified as a contour drawing. In this example, the contour drawing specifies placement of region 110 relative to the eyes, the nose, and the eyebrows of the face to be generated by neural network model 104. Guide data 130 also indicates that the eyes are to be open. Neural network model 104 is capable of generating region 120 to conform with guide data 130 while also placing region 110 within region 120 at the location indicated by guide data 130. In the example, region 110 may be included as is, e.g., in an unmodified form, within region 120. Region 110 effectively abuts region 120.

FIG. 3B illustrates an example of guide data 130 specified as a mesh wireframe. The mesh wireframe of FIG. 3B provides increased detail as to the formation of region 120. For example, the mesh wireframe of FIG. 3B specifies placement of region 110 relative to the eyes, the nose, and the eyebrows of the face to be generated by neural network model 104, and also the curvature of surfaces of the face to be generated. Guide data 130 also indicates that the eyes are to be open. Neural network model 104 is capable of generating region 120 to conform with guide data 130 while also placing region 110 within region 120 at the location indicated by guide data 130. In the example, region 110 may be included as is, e.g., in an unmodified form, in region 120. Region 110 effectively abuts region 120.

In each of the examples of FIGS. 3A and 3B, guide data 130 conveys information to neural network model 104 describing the desired shape of head to be generated. Further information may be conveyed other than placement of features. For example, as noted, head pose information may be provided with guide data 130 to neural network model 104 as input.

In one or more example implementations, guide data 130 may be predefined to describe a particular type of face to be generated. Guide data 130 may include a marker or designated location that region 120 is to be inserted or pasted. In one aspect, neural network model 104 is capable of receiving guide data 130 and region 110, generating region 120, and inserting region 110 in unmodified form into region 120 as specified by guide data 130. That is, neural network model 104 does not generate the mouth region of the head. Instead, neural network model 104 uses region 110 as the mouth of the head that is generated.

Figure 4:
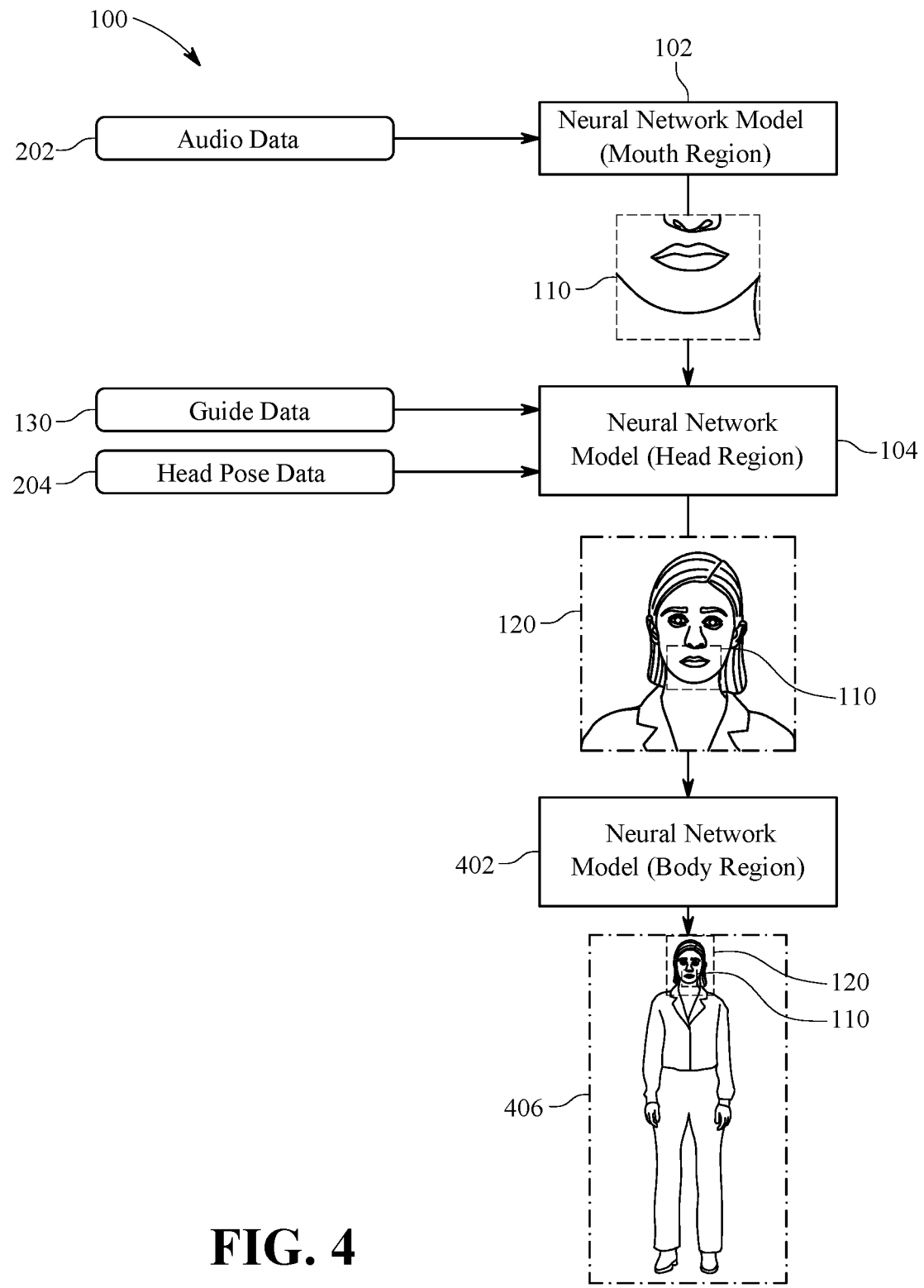
FIG. 4 illustrates another example implementation in which a network architecture is augmented to include an additional hierarchical level.

FIG. 4 illustrates another example where network architecture 100 is augmented to include an additional hierarchical level. In the example, network architecture 100 is augmented to include a further neural network model 402. As shown, in this example, region 120 (including region 110 therein) is provided to neural network model 402. Neural network model 402 may be implemented as described in connection with neural network model 102 and/or neural network model 104. Neural network model 402 may be trained or configured to generate a particular region of the image, albeit a region or portion that is different from that generated by either of neural network model 102 and/or neural network model 104. Neural network model 402 is operative to generate region 406. Region 406 is the portion of the image that includes the body that is joined with region 120 having region 110 included therein.

In one aspect, neural network model 402 is capable of cropping region 120 to join region 120 to region 406. Neural network model 402 does not otherwise modify region 120 and/or region 110 in joining the regions with region 406. In another aspect, neural network model 402 does not modify regions 120 and/or 110 at all (e.g., no cropping is performed) in joining regions 120 and/or 110 with region 406. In the example, region 120 shares at least a portion of a boundary with region 406.

In one or more other example implementations, body generation also may be subdivided into two or more different levels of hierarchy. For example, the upper body region of the image may be generated using a neural network model configured, or trained, to generate the upper body while the lower body region of the image may be generated by yet another neural network model configured, or trained, to generate the lower body region. Each neural network model may be dedicated for that purpose, e.g., upper or lower body region generation as the case may be. The two regions of the body may be joined, with the upper body region being joined with the head region.

In one aspect, in the example implementations of FIGS. 1, 2, and 4, neural network model 102 may be conditioned only on audio (e.g., audio data 202 such as speech) to generate a mouth region such as region 110. Neural network model 102 does not know anything about other features of the head such as the eyes, for example. Network architecture 100, including one or more additional neural network models, is used to generate further regions such as the head and/or body.

In one or more other example implementations, the inventive arrangements may be used in cases where the first neural network is limited in function to generating only region 110 (e.g., a mouth region of an image). In such cases, there may not be a choice to train the first neural network model in any other manner. That is, neural network model 102 may be preconfigured or trained to generate region 110 and may not be modifiable.

Figure 5:
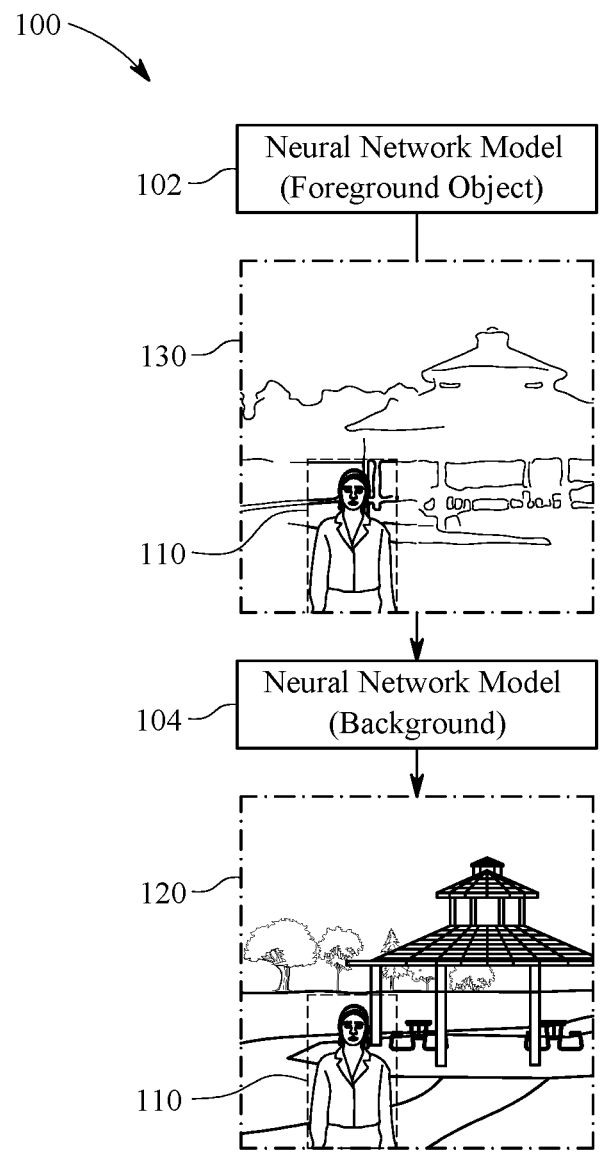
FIG. 5 illustrates another example of a network architecture that is executable by a data processing system to perform hierarchical image generation.

FIG. 5 illustrates another example implementation of network architecture 100. In this example, region 110 is a "high-fidelity" portion of the image to be generated such as a foreground object. The foreground object is a character (e.g., a digital human or avatar). In the example, region 110 is a detailed rendering of the object that has been included or incorporated into guide data 130. It should be appreciated that region 110 may be of any of a variety of other foreground objects such as automobiles, jewelry, or the like. Guide data 130, in this example, is specified as a contour drawing. The contour drawing specifies a background to be generated by neural network model 104. Neural network model 104 is configured, or trained, to generate a background around region 110. Region 120 in this example, having region 110 included therein in unmodified form, represents the final image output by network architecture 100. In this example, the final image is a photorealistic image of a digital human in front of a background.

Figure 6:
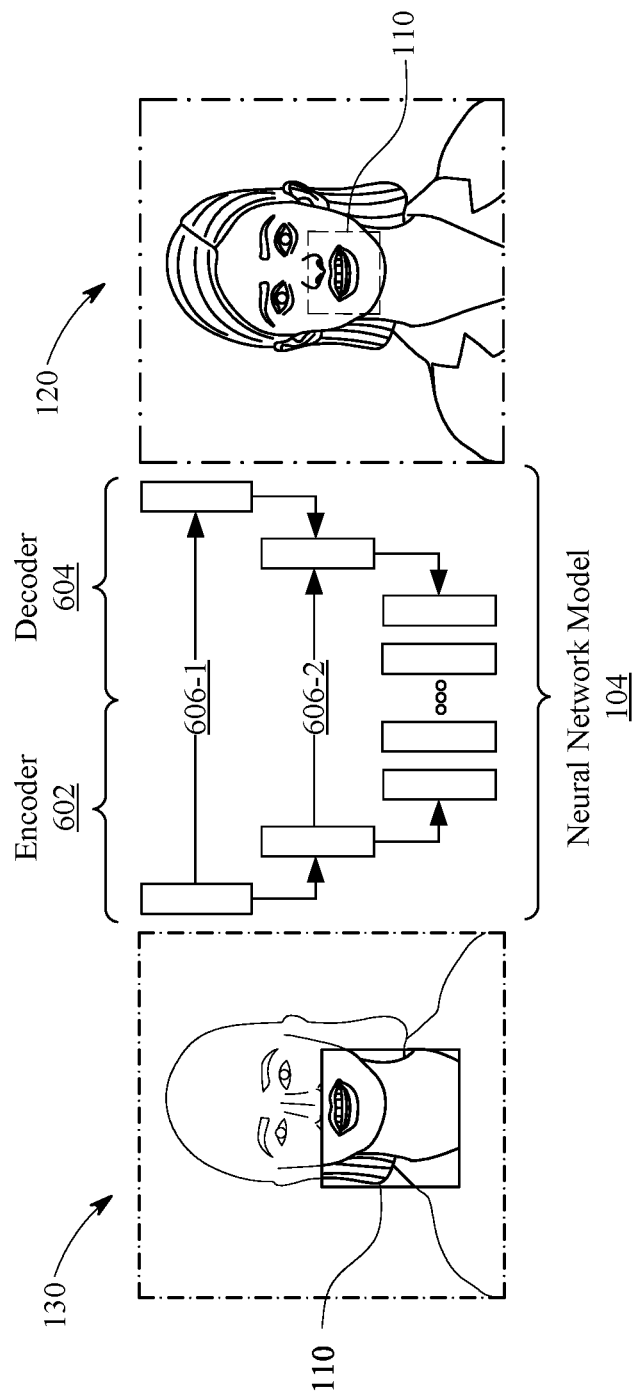
FIG. 6 illustrates an example architecture for a neural network model for use within the example network architecture(s) described herein.

FIG. 6 illustrates an example architecture for neural network model 104. In the example, neural network model 104 is implemented using an encoder-decoder architecture similar to the U-Net architecture. Neural network model 104 includes an encoder 602 portion and a decoder 604 portion. Further, one or more skip connections 606 (e.g., 606-1 and 606-2) may be added. In the example of FIG. 6, skip connections 606 allow neural network model 104 to learn faster because back-propagation does not suffer from the vanishing gradient problem. Skip connections 606 also allow neural network model 104 to learn identity. The learning of identity allows neural network model 104 to output the same pixels and/or textures that are presented at the input. That is, skip connections 606 allow neural network model 104 to generate region 120 with region 110 included therein in unmodified form. Thus, neural network model 104 repeats the mouth region and generates other portions of the resulting image.

The inventive arrangements described herein may be used to generate digital humans within virtual computing environments, e.g., Metaverse worlds. The digital humans may be generated in high resolution for use as avatars, for example. The high-quality and high resolution achieved is suitable for such environments where close-up interaction with the digital human is likely.

The inventive arrangements described herein also may be used to generate digital humans that may be used or function as, virtual news anchors, presenters, or greeters. In illustration, creating or generating videos where the primary content is someone talking would benefit from using digital humans created using the inventive arrangements described herein to achieve improved or more accurate lip motion. Example use cases may include, but are not limited to, a digital human performing a daily news-reading, a digital human functioning as a presenter in a promotional or announcement video, a digital human presented in a store or other place of business to interact with users to answer basic questions, a digital human operating as a receptionist in a place of business such as a hotel room, vacation rental, or other attraction/venue. Use cases include those in which accurate mouths and/or lip motion for enhanced realism is preferred, needed, or required.

In one or more other example implementations, digital humans generated in accordance with the inventive arrangements described herein may be included in artificial intelligence chat bot and/or virtual assistant applications as a visual supplement. Adding a visual component in the form of a digital human to an automated chat bot may provide a degree of humanity to user-computer interactions. In such cases, having high-quality face and lips generated as described herein is important to maintain realism. The disclosed technology can be used as a visual component and displayed in a display device as may be paired or used with a smart-speaker virtual assistant to make interactions more human-like.

FIG. 7 illustrates an example method 700 that may be performed by a system executing network architecture 100. As discussed, network architecture 100 may be executed by a data processing system, e.g., a computer, as described in connection with FIG. 8 or another suitable computing system.

In block 702, the system generates region 110 of an image using neural network model 102. In block 704, the system provides region 110 of the image to neural network model 104 as input. In block 706, the system generates region 120 of the image using neural network model 104. Region 120 of the image shares a boundary with at least a portion of region 110.

In one aspect, neural network model 104 outputs region 110 of the image and region 120 of the image. Region 110, as output from neural network model 104, is unmodified.

In another aspect, neural network model 104 includes one or more skip connections. Each skip connection directly links non-sequential layers of neural network model 104. The skip connection(s) facilitate outputting of region 110 within region 120 in an unmodified form.

In another aspect, the system is capable of implementing a first set of one or more data modalities (e.g., 202) in neural network model 102 and a second set of one or more data modalities (e.g., 204) in neural network model 104. The first set of one or more data modalities differs from the second set of one or more data modalities. For example, the first set of one or more data modalities includes speech and the second set of one or more data modalities includes head position. The first set of modalities may be provided to neural network model 102 as input. The second set of modalities may be provided to neural network model 104 as an additional input.

In another aspect, neural network model 104 generates region 120 using guide data 130 that defines a location of region 110 of the image relative to region 120 of the image. Guide data 130 may be received as an input in conjunction with region 110.

In another aspect, region 110 is a mouth region of an avatar and region 120 of the image is a face region (e.g., head) of the avatar.

In one or more other example implementations, the system includes one or more additional neural network models. For example, the system is capable of providing region 110 of the image and region 120 of the image to a third neural network model (e.g., neural network model 402) as input. The system is capable of generating a further region of the image (e.g., region 406) using neural network model 402. In that case, region 406 of the image shares a boundary with at least a portion of region 120 of the image. Neural network model 402, for example, outputs region 110 of the image, region 120 of the image, and region 406 of the image. In doing so, region 110 and region 120, as output from neural network model 402, are unmodified.

In one or more example implementations, the image that is generated may be used for an avatar in a virtual environment. A series of images may be created to generate motion video. In addition, while the mouth region has been used herein for purposes of illustration, it should be appreciated that the hierarchical architecture and techniques described herein may be used where the first neural network model (e.g., neural network model 102) is used to generate a region such as hair, a shirt, eyes, eyebrows, mouth, teeth, fingers, hands, a foreground object, or the like. Other neural network model(s) may generate other region(s) of the final image that contact, surround, or are adjacent to the initially generated region. Further, as discussed, though digital humans are used throughout this disclosure for purposes of illustration, the inventive arrangements are not intended to be so limited. Rather, the inventive arrangements may be used to generate any of a variety of images in which increased realism and accuracy are desired.

Figure 8:
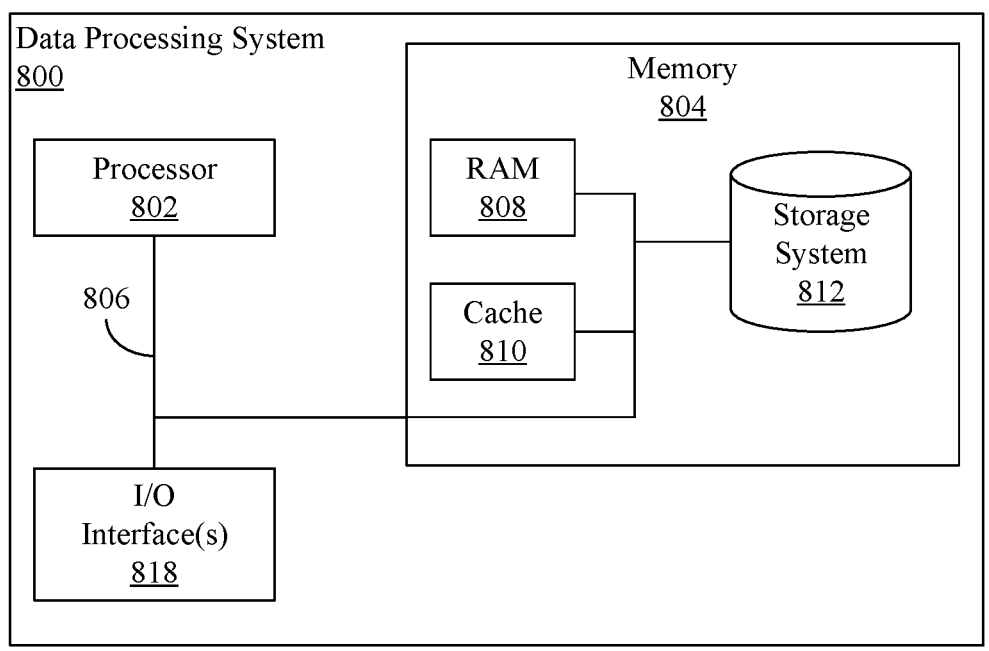
FIG. 8 illustrates an example implementation of a data processing system that is capable of executing a network architecture.

FIG. 8 illustrates an example implementation of a data processing system 800. As defined herein, the term "data processing system" means one or more hardware systems configured to process data, each hardware system including at least one processor and memory, wherein the processor is programmed with computer-readable instructions that, upon execution, initiate operations. Data processing system 800 can include a processor 802, a memory 804, and a bus 806 that couples various system components including memory 804 to processor 802.

Processor 802 may be implemented as one or more processors. In an example, processor 802 is implemented as a central processing unit (CPU). Processor 802 may be implemented as one or more circuits capable of carrying out instructions contained in program code. The circuit may be an integrated circuit or embedded in an integrated circuit. Processor 802 may be implemented using a complex instruction set computer architecture (CISC), a reduced instruction set computer architecture (RISC), a vector processing architecture, or other known architectures. Example processors include, but are not limited to, processors having an x86 type of architecture (IA-32, IA-64, etc.), Power Architecture, ARM processors, and the like.

Bus 806 represents one or more of any of a variety of communication bus structures. By way of example, and not limitation, bus 806 may be implemented as a Peripheral Component Interconnect Express (PCIe) bus. Data processing system 800 typically includes a variety of computer system readable media. Such media may include computer-readable volatile and non-volatile media and computer-readable removable and non-removable media.

Memory 804 can include computer-readable media in the form of volatile memory, such as random-access memory (RAM) 808 and/or cache memory 810. Data processing system 800 also can include other removable/non-removable, volatile/non-volatile computer storage media. By way of example, storage system 812 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 806 by one or more data media interfaces. Memory 804 is an example of at least one computer program product.

Memory 804 is capable of storing computer-readable program instructions that are executable by processor 802. For example, the computer-readable program instructions can include an operating system, one or more application programs, other program code, and program data. The computer-readable program instructions may implement network architecture 100 as described herein. Processor 802, in executing the computer-readable program instructions, is capable of performing the various operations described herein that are attributable to a computer. It should be appreciated that data items used, generated, and/or operated upon by data processing system 800 are functional data structures that impart functionality when employed by data processing system 800. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

Data processing system 800 may include one or more Input/Output (I/O) interfaces 818 communicatively linked to bus 806. I/O interface(s) 818 allow data processing system 800 to communicate with one or more external devices and/or communicate over one or more networks such as a local area network (LAN), a wide area network (WAN), and/or a public network (e.g., the Internet). Examples of I/O interfaces 818 may include, but are not limited to, network cards, modems, network adapters, hardware controllers, etc. Examples of external devices also may include devices that allow a user to interact with data processing system 800 (e.g., a display, a keyboard, a microphone for receiving or capturing audio data, speakers, and/or a pointing device).

Data processing system 800 is only one example implementation. Data processing system 800 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

The example of FIG. 8 is not intended to suggest any limitation as to the scope of use or functionality of example implementations described herein. Data processing system 800 is an example of computer hardware that is capable of performing the various operations described within this disclosure. In this regard, data processing system 800 may include fewer components than shown or additional components not illustrated in FIG. 8 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

The terminology used herein is for the purpose of describing particular example implementations only and is not intended to be limiting. Notwithstanding, several definitions that apply throughout this document now will be presented.

As defined herein, the singular forms "a," "an," and "the" are intended to include the plural forms as well, unless the context clearly indicates otherwise.

The term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without intervention of a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The different types of memory, as described herein, are examples of a computer readable storage media. A non-exhaustive list of more specific examples of a computer readable storage medium may include: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "responsive to" and similar language as described above, e.g., "if," "when," or "upon," mean responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the present invention. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may specify state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In this way, operatively coupling the processor to program code instructions transforms the machine of the processor into a special-purpose machine for carrying out the instructions of the program code. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowcharts or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A computer-implemented method, comprising:
generating, by computer hardware using a first neural network model, a first region of an image based on a first set of one or more data modalities provided to the first neural network model as input;
providing the first region of the image to a second neural network model as input; and
generating, by the computer hardware using a second neural network model, a second region of the image based on a second set of one or more data modalities provided to the second neural network model as additional input, wherein the first set of one or more data modalities differs from the second set of one or more data modalities, and wherein the second region of the image shares a boundary with at least a portion of the first region of the image;
wherein the second neural network model includes a skip connection that directly links non-sequential layers of the second neural network model, and wherein the skip connection configures the second neural network model to output the first region unmodified and positioned within the second region.

2. The computer-implemented method of claim 1, further comprising:
receiving, by the second neural network model, guide data and head pose data, wherein the second region is generated based on the head pose data and the first region is positioned within the second region based on the guide data.

3. The computer-implemented method of claim 2, wherein the guide data defines a location of the first region of the image relative to the second region of the image.

4. The computer-implemented method of claim 1, wherein the first set of one or more data modalities includes speech and the second set of one or more data modalities includes head position.

5. The computer-implemented method of claim 1, wherein the first region of the image is a mouth region of an avatar and the second region of the image is a head region of the avatar.

6. The computer-implemented method of claim 1, further comprising:
providing the first region of the image and the second region of the image to a third neural network model as input; and
generating a third region of the image using the third neural network model, wherein the third region of the image shares a boundary with at least a portion of the second region of the image;
wherein the third neural network model outputs the first region of the image, the second region of the image, and the third region of the image, and wherein the first region of the image and the second region of the image, as output form the third neural network model, are unmodified.

7. The computer-implemented method of claim 1, further comprising:
using the image for an avatar in a virtual environment.

8. A system, comprising:
one or more processors configured to initiate operations including:
generating, by the one or more processors using a first neural network model, a first region of an image based on a first set of one or more data modalities provided to the first neural network model as input;
providing the first region of the image to a second neural network model as input; and
generating, by the one or more processors using a second neural network model, a second region of the image based on a second set of one or more data modalities provided to the second neural network model as additional input, wherein the first set of one or more data modalities differs from the second set of one or more data modalities, and wherein the second region of the image shares a boundary with at least a portion of the first region of the image;
wherein the second neural network model includes a skip connection that directly links non-sequential layers of the second neural network model, and wherein the skip connection configures the second neural network model to output the first region unmodified and positioned within the second region.

9. The system of claim 8, wherein the one or more processors are configured to initiate operations including:
receiving, by the second neural network model, guide data and head pose data, wherein the second region is generated based on the head pose data and the first region is positioned within the second region based on the guide data.

10. The system of claim 9, wherein the guide data defines a location of the first region of the image relative to the second region of the image.

11. The system of claim 8, wherein the first set of one or more data modalities includes speech and the second set of one or more data modalities includes head position.

12. The system of claim 8, wherein the first region of the image is a mouth region of an avatar and the second region of the image is a head region of the avatar.

13. The system of claim 8, wherein the one or more processors are configured to initiate operations including:
providing the first region of the image and the second region of the image to a third neural network model as input; and
generating a third region of the image using the third neural network model, wherein the third region of the image shares a boundary with at least a portion of the second region of the image;
wherein the third neural network model outputs the first region of the image, the second region of the image, and the third region of the image, and wherein the first region of the image and the second region of the image, as output form the third neural network model, are unmodified.

14. The system of claim 8, wherein the one or more processors are configured to initiate operations including:
using the image for an avatar in a virtual environment.

15. A computer program product, comprising:
one or more computer readable storage mediums, and program instructions collectively stored on the one or more computer readable storage mediums, wherein the program instructions are executable by computer hardware to initiate operations including:
generating, by computer hardware using a first neural network model, a first region of an image based on a first set of one or more data modalities provided to the first neural network model as input;
providing the first region of the image to a second neural network model as input; and
generating, by the computer hardware using a second neural network model, a second region of the image based on a second set of one or more data modalities provided to the second neural network model as additional input, wherein the first set of one or more data modalities differs from the second set of one or more data modalities, and wherein the second region of the image shares a boundary with at least a portion of the first region of the image;
wherein the second neural network model includes a skip connection that directly links non-sequential layers of the second neural network model, and wherein the skip connection configures the second neural network model to output the first region unmodified and positioned within the second region.

16. The computer program product of claim 15, wherein the first set of one or more data modalities includes speech and the second set of one or more data modalities includes head position.

* * * * *